INVENTORS
STANLEY J. GUSTETIC
CHARLES B. BOYTZ
HENRY ENGEL
BY Baldwin, Doran & Egan
ATTORNEYS

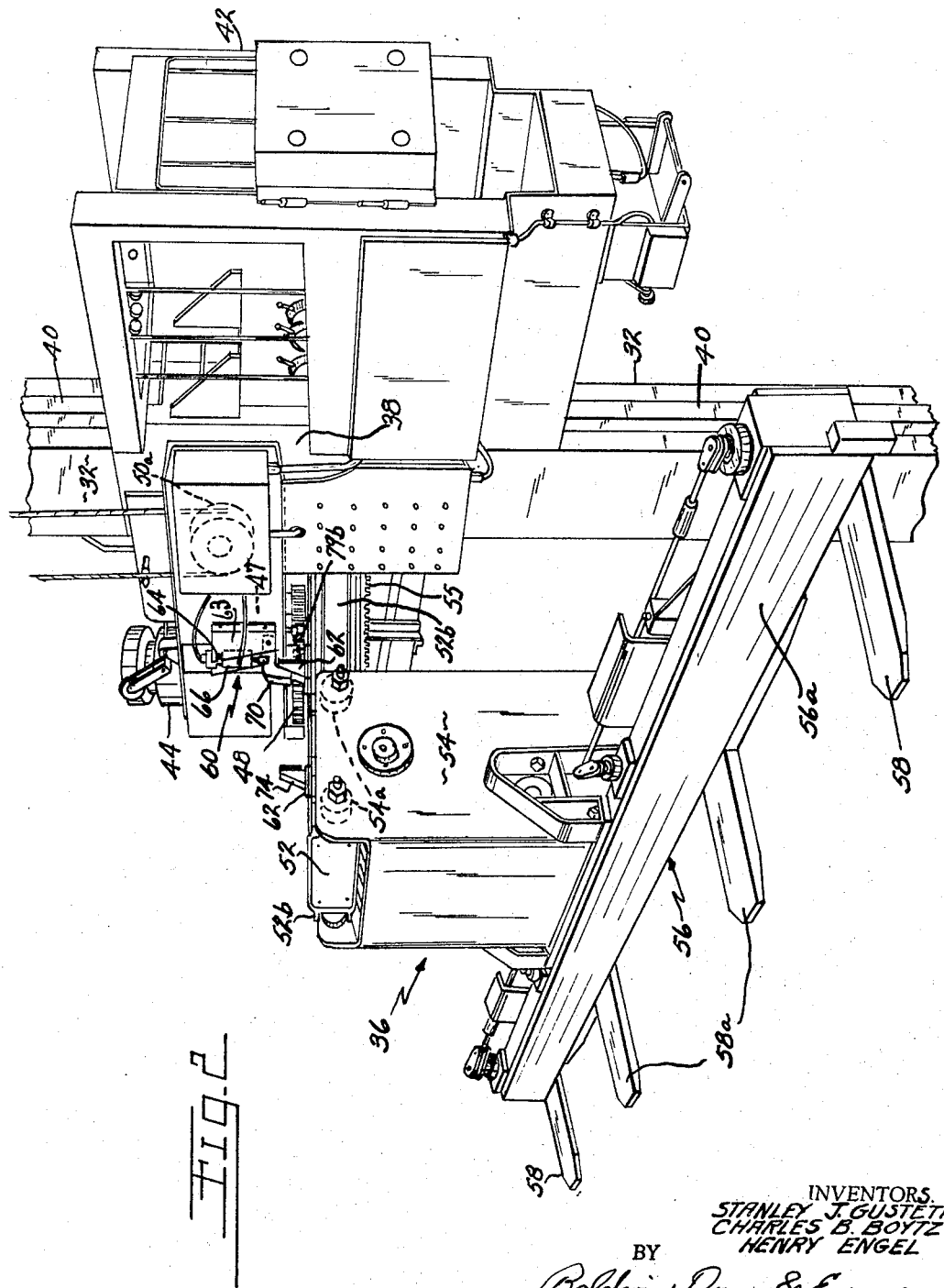

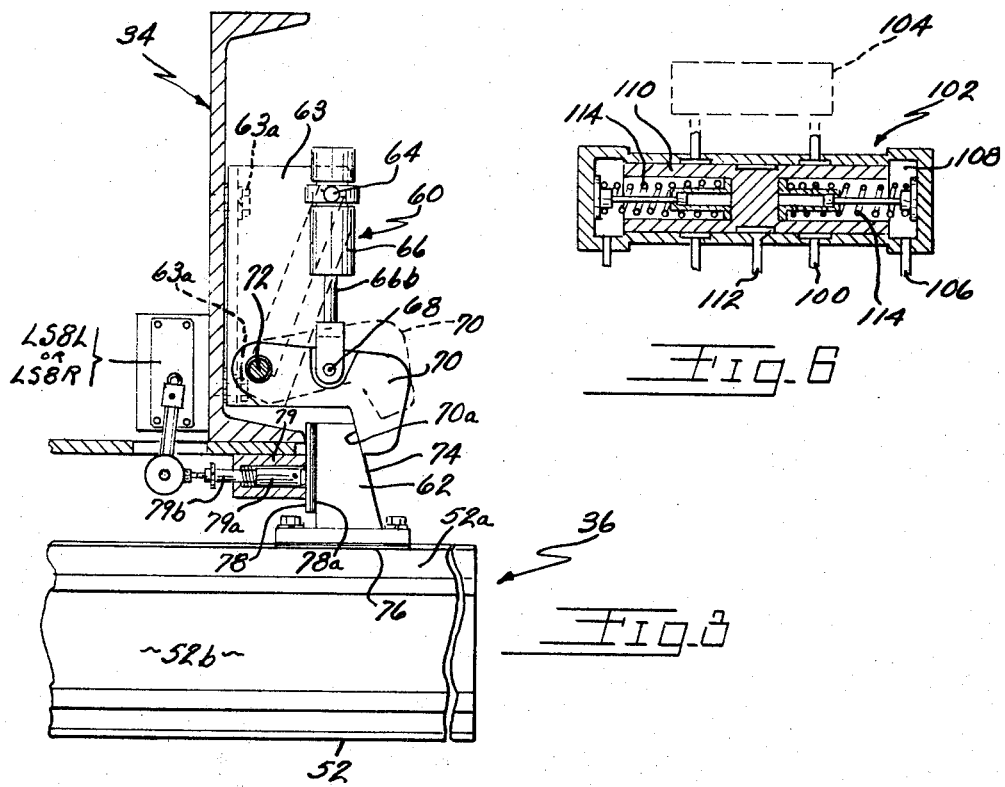
Fig. 6
Fig. 3
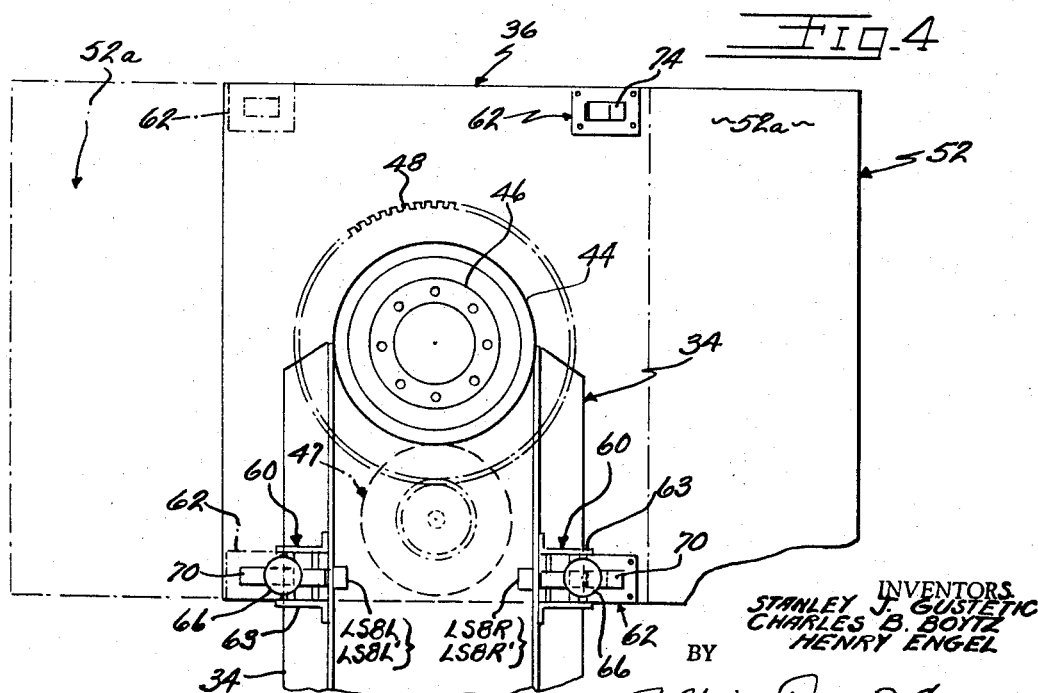
Fig. 4
INVENTORS
STANLEY J. GUSTETIC
CHARLES B. BOYTZ
HENRY ENGEL
BY
Baldwin, Doran & Egan
ATTORNEYS

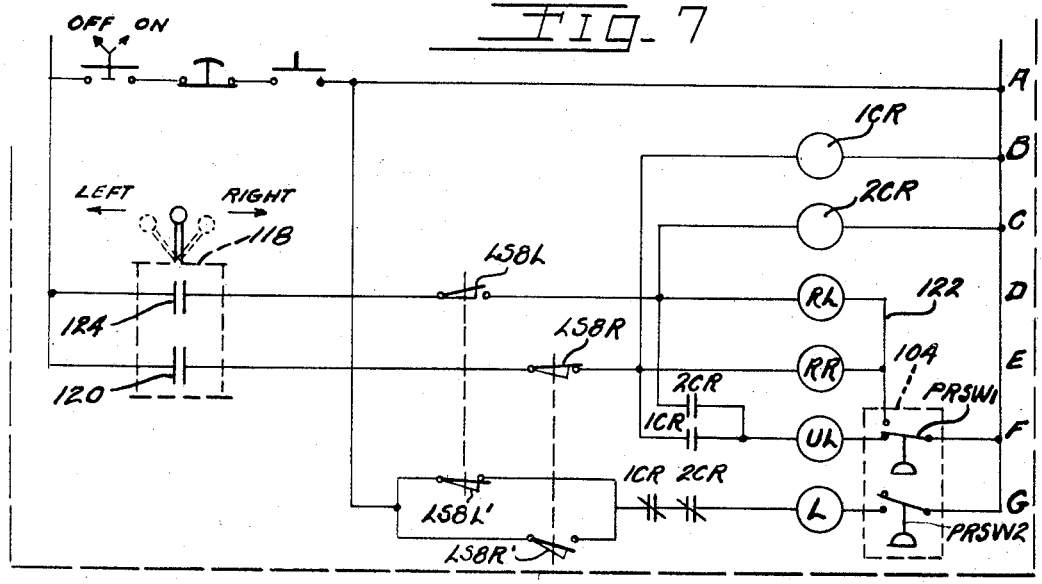
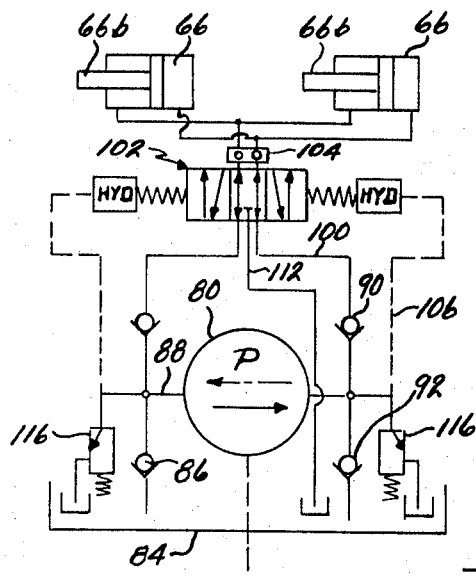
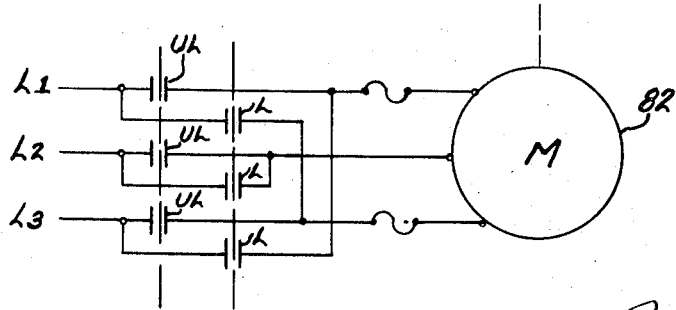

United States Patent Office 3,420,389
Patented Jan. 7, 1969

3,420,389
AUTOMATIC LOCKING MECHANISM FOR A ROTARY LOAD CARRIER IN A STORAGE SYSTEM
Stanley J. Gustetic, Euclid, Charles B. Boytz, Garrettsville, and Henry Engel, Euclid, Ohio, assignors to The Euclid Crane and Hoist Company, Cleveland, Ohio, a corporation of Ohio
Filed Sept. 29, 1966, Ser. No. 582,997
U.S. Cl. 214—16.4        9 Claims
Int. Cl. B65g 1/00

ABSTRACT OF THE DISCLOSURE

A load carrier having an extractor mechanism rotatable about a generally vertical exis, with the extractor mechanism being adapted to insert loads into and remove loads from an associated storage frame disposed alongside a travel zone in which the load carrier is movable, and with the extractor mechanism being adapted to move laterally into and from the storage frame, together with clamping means for locking the extractor mechanism in parallel extending relationship with respect to the direction of extension of the travel zone, so that the extractor will be properly positioned with respect to load supporting means of the storage frame.

This invention relates in general to an automatic warehousing system or load handling apparatus for storing articles, and more particularly relates to a clamping mechanism for use with a movable load carrier of the system, for locking the load carrier in predetermined position with respect to the storage frame of the system.

In United States Patent 3,268,097, issued Aug. 23, 1966, in the name of Stewart F. Armington et al. and entitled, Stacker Crane, there is disclosed an automatic warehousing system including a movable load carrier in the form of a stacker crane, of the general type with which the instant invention may be used. Such load carrier of the aforesaid patent is supported on a pair of rails disposed parallel with a travel zone or aisle adjacent to a storage frame, with the load carrier being adapted to travel both horizontally and vertically in the aisle and to deposit and retrieve loads or articles from the storage frame. The load carrier of said patent includes an extractor mechanism comprising a laterally movable carriage and a cantilever-like load supporting means in the form of an extractor fork, attached to the carriage for supporting a load and moving the load into or from the storage frame. The extractor mechanism in turn is mounted for rotation about a generally vertically extending axis, so that it can be moved to opposite sides of the load carrier, thus providing for the insertion and/or the retraction of loads on both sides of the aisle.

The present invention provides novel mechanism for use with the load carrier, for locking the extractor mechanism and more particularly the load supporting means thereof, in parallel relation with the respect to the aisle, so that the extractor fork will be in parallel aligned relationship with respect to the storage frame during its lateral movement to deposit a load into or remove a load from the storage frame. This parallel alignment of the extractor fork with respect to the storage frame ensures that no interference will occur between the extractor fork and the storage frame during the movement of the extractor toward and from the storage frame, and thus ensures trouble-free pickup and deposit of loads into or from the storage frame and proper positioning of the loads in the storage frame.

Accordingly, an object of the invention is to provide a novel load handling apparatus including a load carrier and storage mechanism, and which includes means for locking the apparatus in predetermined position with respect to the storage mechanism.

Another object of the invention is to provide a load handling apparatus which includes a load carrier having an extractor mechanism rotatable about a generally vertical axis, with the extractor mechanism being adapted to insert loads into and remove loads from an associated storage frame disposed alongside a travel zone in which the load carrier is movable, and with the extractor mechanism being adapted to move laterally into and from the storage frame, together with clamping means for locking the extractor mechanism in parallel extending relationship with respect to the direction of extension of the travel zone, so that the extractor will be properly positioned with respect to load supporting means of the storage frame.

A further object of the invention is to provide a clamping mechanism of the latter mentioned type which includes a fluid power actuated motor unit which is automatically actuated upon movement of the extractor into generally confronting relationship with respect to the storage frame for actuating the clamping mechanism, and which includes means for automatically actuating the fluid motor unit to deactuate the clamping mechanism upon the initiation of rotational movement of the extractor mechanism about its generally vertical axis.

A still further object of the invention is to provide a load handling apparatus including a load carrier movable in a travel zone alongside a storage frame, with the load carrier comprising an extractor mechanism rotatable by means of a motor unit about a generally vertical axis so that the extractor mechanism can be selectively rotated into a confronting position with respect to the storage frame and selectively rotated away from such confronting position, with the extractor mechanism being adapted to insert loads into and remove loads from the storage frame, and with there being clamping mechanism provided for locking the extractor mechanism in parallel extending relationship with respect to the direction of extension of the travel zone, and with respect to the confronting storage frame, and with such clamping mechanism including a hydraulically powered reciprocal type motor unit and various controls for the motor unit, so that the motor unit is automatically actuated to clamp the extractor mechanism in said parallel extending relationship with respect to the storage frame and the travel zone upon rotation of the extractor mechanism into said confronting position, and wherein there is provided means for automatically actuating the hydraulic motor unit to cause deactuation of the clamping mechanism upon initiation of actuation of the motor unit controlling rotation of the extractor away from its confronting relationship with respect to the storage frame.

Other objects and advantages of the invention will be apparent from the following description taken in conjunction with the accompanying drawings wherein:

FIGURE 1 is a generally diagrammatic and elevational view of a load handling and storage mechanism embodying the instant invention;

FIGURE 2 is an enlarged, perspective, fragmentary view of the vertically movable hoist carriage of the load handling mechanism, and showing the extractor in an operative position wherein it extends parallel to the direction of extension of the travel zone and in confronting relation to the storage frame of the system, and illustrating the clamping mechanism mounted on the hoist carriage disposed in clamping condition, so as to lock the extractor mechanism in said parallel relationship;

FIGURE 3 is an enlarged, fragmentary, sectional elevational view of the clamping mechanism, and showing in full lines the locking position and in dotted lines the deactuated position of the clamping hook of the clamping mechanism, and also illustrating electrical switch mechanism responsive to actuation of a spring loaded plunger by a locking lug of the clamping mechanism;

FIGURE 4 is a top plan diagrammatic illustration of the clamping lugs on the rotatable extractor mechanism and showing in full lines the position of such rotatable mechanism when the extractor is disposed in confronting relationship to one side of the storage frame and in phantom lines the position of the extractor mechanism and clamping lugs when it has been rotated 180° to confronting relationship to the other side of the storage frame;

FIGURE 5 is a schematic illustration of a hydraulic circuit and associated hydraulic actuated motor units, for powering the clamping mechanism to effect the clamped and the unclamped conditions of the extractor when the latter is in predetermined positions with respect to the storage frame sections;

FIGURE 6 is a diagrammatic sectional illustration of the directional control valve of the FIG. 5 circuitry; and FIGURE 7 is a schematic illustration of a simplified electrical control circuit for controlling the actuation of the hydraulic circuit of FIGURE 5.

Figure 1:
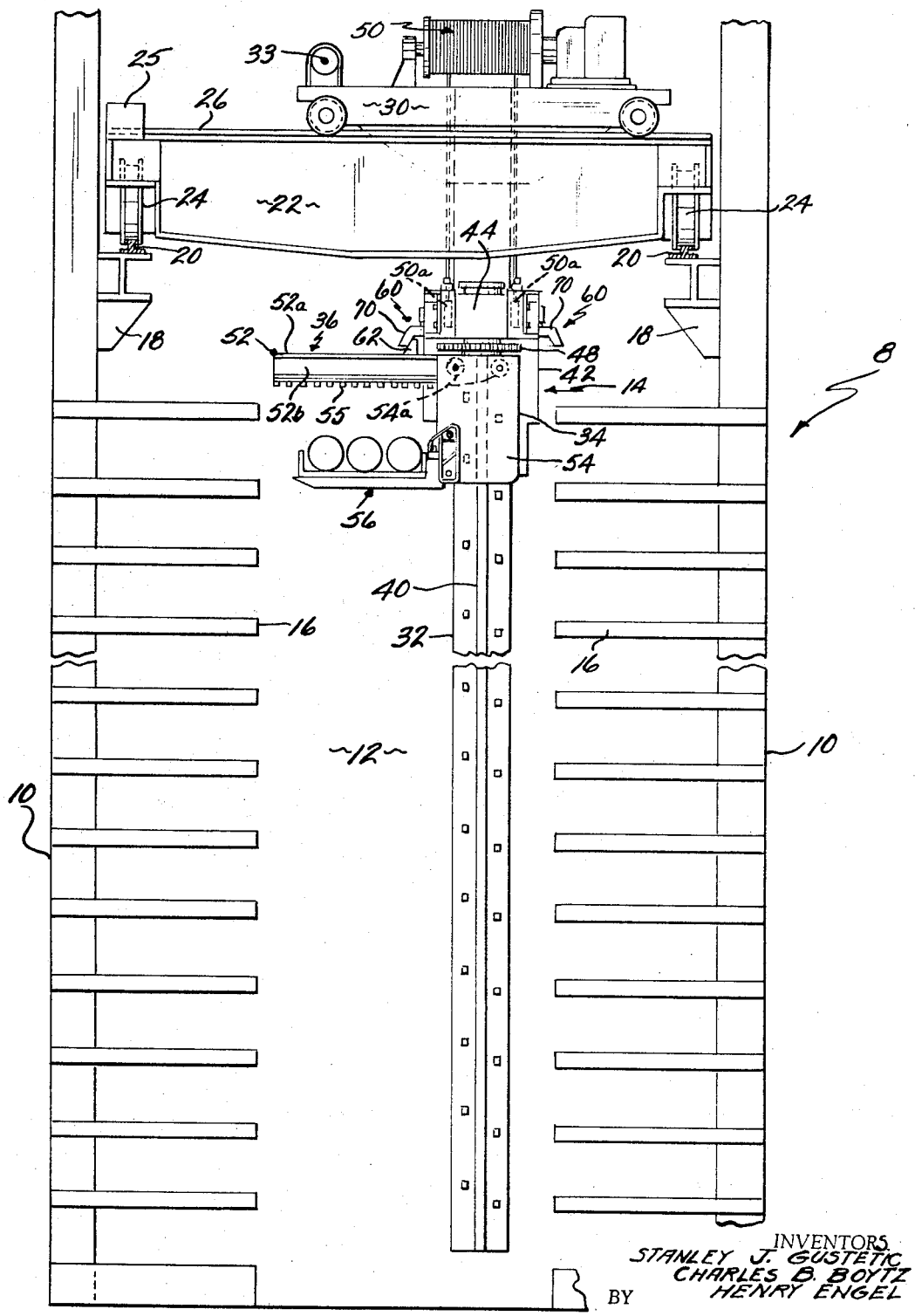

Referring now again to the drawings, the warehousing system herein illustrated may comprise a storage frame 8 formed of parallel rows of vertical posts 10 defining between them an aisle or travel zone 12 in which is adapted to travel a load carrier 14 for depositing a load into or retrieving a load from the storage frame. The posts 10 are adapted, in the embodiment illustrated, to support a plurality of vertically spaced load supports 16 which may comprise cantilevered arms extending generally horizontally away from the posts and toward the aisle, for supporting a load thereon. In the embodiment illustrated, the posts 10 are provided with supports 18 mounting rails 20 thereon which rails extend parallel to the aisle above the load supports 16.

The aforementioned load carrier 14 may include a mobile bridge 22 extending across the aisle and being supported for movement lengthwise of the aisle as by means of wheels 24 coacting in rolling engagement with rails 20. Bridge 22 may be actuated for movement on rails 20 by any suitable means, such as for instance electric motor 25 suitably coupled to the wheels 24. Mounted on the bridge 22 may be rails 26 extending transversely of the bridge, and which may support a trolley 30 which in turn may support a depending mast 32 extending downwardly into the aisle. Trolley 30 may be actuated on rails 26 by any suitable means, such as for instance an electric motor 33 suitably coupled to the trolley wheels. Transverse movement of the trolley with respect to the bridge moves the mast with the trolley transversely of aisle 12.

The hoist carriage 34 may include a suitable sleevelike member 38 which may have a central vertical opening therethrough receiving the mast and associated preferably replaceable, guiding ribs or bars 40 on opposite sides of the mast. The hoist carriage may support a cab 42 thereon, disposed on one side of the mast, and in which cab an operator may ride. Suitable controls may be located in the cab for actuating and controlling the load handling mechanism as will be hereinafter described in greater detail.

On the other side of the mast, the hoist carriage may support a turret bearing member 44 rotatably mounting a turret member 46 (FIG. 4) which supports the extractor means 36, thereby providing for movement of the extractor means either to the right or to the left-hand side of the mast, and thus providing for insertion and/or retraction of loads on both sides of the storage frame. Suitable power means, such as for instance, a reversible electric motor 47 (FIG. 4) mounted on the hoist carriage may be operatively coupled to for instance, a ring gear 48 secured to the extractor means, for rotating the latter about a generally vertical axis. Any suitable means may be provided for moving the hoist carriage vertically of the mast 32 and as for instance winch mechanism 50 mounted on trolley 30 and suitably coupled to the hoist carriage as at 50a.

Extractor means 36 may include a cantilevered support frame 52 comprising a top wall 52a and two spaced parallel tracks 52b which in turn may support the horizontally movable extractor carriage 54. Carriage 54 may have wheels 54a rotatably mounted on the inner sides thereof and disposed in rolling coaction with the tracks 52a on the cantilevered support framework 52 for supporting the extractor carriage for horizontal movement on the tracks. Suitable power means such as a reversible electric motor (not shown) may be provided for driving the extractor carriage 54 horizontally on the tracks 52a and in the embodiment illustrated such motor is adapted to actuate gear means drivingly engaged with racks 55 mounted on the bottom of each of the pair of tracks 52a for causing horizontal movement of the extractor carriage.

The extractor carriage 54 is adapted to support the load carrying means which in the embodiment illustrated comprises an extractor fork member 56 disposed in cantilever fashion on the extractor carriage. Fork member 56 may comprise an elongated backup beam 56a preferably of hollow construction having load supporting tines 58, 58a extending generally horizontally outwardly therefrom, and with such tines being preferably movably coupled to the backup beam member for pivoting in a generally horizontal plane. The extractor fork may be of the general type illustrated and described in the copending U.S. patent application of George E. Armington et al., Ser. No. 566,290, filed July 19, 1966 and reference may be had thereto for a detailed description of such an extractor fork construction.

Now in accordance with the instant invention, there is provided clamping means 60 (FIGURES 3 and 4) mounted on opposite sides of the hoist carriage structure 34 with such clamping means being adapted for locking coaction with locking members 62 preferably detachably mounted on the rotatable extractor framework 52. Each clamping mechanism 60 may include a supporting bracket structure 63 secured as by means of fasteners 63a to the associated side of the hoist carriage 34 and pivotally mounting as at 64, a reciprocal fluid powered double acting motor unit 66. The cylinder of the motor unit 66 may be pivoted to the bracket 63 while the piston rod 66b of the motor unit may be pivotally connected, as at 68, to a locking hook member 70, which in turn is pivoted as at 72 to the aforementioned bracket 63. Each hook member 70 may have a tapered locking face 70a (FIG. 3) thereon adapted for wedging coaction with a complementary tapered face 74 on the respective wedge block or locking member 62.

Shims 76 may be utilized in mounting the respective wedge block on the extractor frame 52 and with the face on the wedge block opposite to the face 74 being preferably provided with a bearing plate 78 and including shims 78a, for adjusting the position of the bearing plate 78 laterally with respect to the wedge block proper, and for a purpose to be hereinafter described.

Mounted in a housing 79 secured to hoist carriage 34 and in generally underlying relation to each clamp mechanism 60 may be a spring loaded plunger 79a, adapted for engagement with bearing plate 78 on the respective wedge block for mechanical actuation of associated conventional spring loaded limit switch LS8. It will be understood that when the extractor frame 52 is rotated from the position shown in FIG. 3, so as to move wedge block 62 from engagement with plunger 79a, the plunger is automatically moved outwardly with respect to its housing 79 to permit movement of the spring loaded actuator arm and thus operation of the LS8 switch. Stop 79b may be provided on the plunger 79a to limit outward movement thereof with respect to housing 79.

As can be seen from FIGURE 3, upon retraction of the piston rod of the fluid powered motor unit 66, the locking hook 70 is pivoted upwardly about its pivot 72 and out of coacting relationship with the associated wedge block 62. Upon extension of the piston rod of the motor unit, the locking hook 70 is pivoted downwardly into locking coaction with the associated wedge block. The tapered surfaces 70a and 74 on respectively the locking hook and the locking block 62 provide for a positive urging of the extractor mechanism into aligned relationship with the storage frame section disposed in confronting relation to the load handling fork 56 of the extractor mechanism.

Referring now to FIGURES 5 and 6, there is schematically illustrated a hydraulic system for controlling the actuation of the aforementioned fluid powered motor units 66. Such system may include a reversible pump 80, which may be of the gear type, and which is operated to furnish the pressurized fluid to the motor units for actuating the same. As can be seen, the motor units 66 are connected in parallel so that actuation thereof occurs simultaneously upon operation of the pump. A reversible electric motor 82 may be provided for operating the pump.

With the motor 82 running in one direction, the pump 80 may be actuated for instance in the direction of the full line arrow, causing the hydraulic fluid to flow from the reservoir 84, thereby lifting check valve 86 as the hydraulic fluid passes therethrough. The fluid then flows through line 88 to the suction side of the pump and through the pump, and is forced past check valve 90, with check valve 92 preventing the fluid from returning to the reservoir at this point. The fluid then flows up through line 100 through the directional control valve 102, through pressure switch connection 104, and into the piston head side of the cylinders of the motor units 66 to actuate the same.

As the pressure is built up, the fluid also flows as for instance via line 106 to the passage 108 at the right of the control valve 102 (FIG. 6), thereby causing the valve spool 110 (FIG. 6) to move to the left, which positions the spool grooves in line with the ports on the piston rod side of each of the motor units 66. This permits the fluid in the cylinders of the motor units to exhaust, causing the piston and associated piston rod 66b to move to the left (with reference to FIG. 5). The fluid exhausting from the motor unit cylinders passes back through the tank line 112 to the reservoir. The valve spool will remain in this position until the pump stops. When the motor 82 is shut off, the springs 114 associated with the spool, center the latter closing off the exhaust passages and locking the pistons of the motor units 66 in position. With the motor 82 running in the reverse direction, the pump 80 is driven in the opposite direction (the direction of the broken line arrow) and movement of the spool of the directional control valve is reversed, causing the pistons and associated piston rods of the motor units to retract, or in other words move toward the right (with reference to FIG. 5). Relief valves 116 may be provided for preventing overloading of the circuitry. The aforementioned pressure switch mechanism 104 in the system may be of conventional type and preferably is a duplex switch, which can be mounted directly to the pump. Each switch therein is a single pole double throw, non-inductive type switch, and a suitable commercial form of switch has been found to be one manufactured by Oil-Dyne Inc. of Minneapolis, Minn., and known as Model 200 Standard Duty Duplex Pressure Switch.

Referring now to FIGURE 7 and assuming for purposes of discussion that the extractor mechanism is facing toward the left (as shown with reference to FIGURE 2) and the clamping mechanism is in clamping condition, the operation of the load handling mechanism may be as follows. When the control 118 disposed for instance in the cab 42 is actuated by the crane operator preparatory to rotating the extractor mechanism to the right, the contacts 120 controlled by the control 118 are closed. Since the extractor is facing toward the left, switch LS8L is being held open by the engagement of its associated plunger 79a with the respective wedge lug 62, thus actuating switch LS8L. However, switch LS8R (on the right side of the hoist carriage) is in closed position since its actuating plunger is not being engaged by a wedge lug. Accordingly, "rotation to the right" relay coil 1CR is energized, thereby closing normally open relay contacts 1CR in line F (FIG. 7) and opening normally closed relay contacts 1CR in line G. Relay coil UL (line F) is thus energized.

Energization of coil UL closes relay contacts UL in the conventional motor circuit of the motor 82 drivingly coupled to the pump 80, causing rotation of the pump in a counterclockwise direction (with reference to FIGURE 5) thereby pumping hydraulic fluid in the direction of the broken line arrow (FIG. 5). The pistons and piston rods of the motor units 66 are thus retracted with respect to the motor unit cylinders, causing upward pivoting of the locking hook 70 of each clamping means 60 about its pivotal axis 72 and unlocking the extractor, to permit rotary motion thereof. The pump 80 continues to operate and builds up pressure on the right-hand side of relay coil UL (FIG. 7) and when sufficient pressure is built up (e.g. 1400 p.s.i.) pressure switch PRSW1 of switch mechanism 104 is opened while pressure switch PRSW2 is closed. Opening of pressure switch PRSW1 automatically deactivates coil UL, thus opening relay contacts UL in the circuit of motor 82 and stopping the pump 80.

When pressure double throw switch PRSW1 opens to deactivate the motor 82 of the pump, it completes a circuit to line 122 (FIG. 7) thereby causing energization of relay coil RR, the contacts of which are coupled in conventional manner with the circuit of electric motor 47 for rotating the extractor mechanism, to thus cause the extractor mechanism to be rotated away from the FIG. 2 position toward the right. Since the clamping mechanisms 60 are in deactivated condition as aforedescribed, the extractor mechanism rotates from its confronting relationship with respect to the left-hand storage frame section toward the right-hand storage frame section.

The motor 47 continues to rotate the extractor toward the right and the pump 80 for the hydraulic clamping mechanism 60 remains in off condition until limit switch LS8R is actuated by engagement of the spring loaded plunger 79a on the right side of the hoist carriage with the confronting abutment plate 78 of one of the locking lugs 62 causing opening of limit switch contact LS8R in line E (FIG. 7) and thus deenergization of coil RR to deactivate motor 47 controlling the rotation of the extractor. Opening of contact LS8R in line E closes the other contact LS8R' thereof. It will be understood, of course, that as the extractor mechanism was rotated away from its aforedescribed left facing position, the locking lug 62 on the extractor that was engaging its associated plunger 79a to hold switch contact LS8L (in line D) in open position, moves with the extractor to permit switch contact LS8L in line D to close, thereby permitting switch contact LS8L' in line G to open.

Since pressure switch PRSW2 (line G) is in closed condition as aforediscussed, and since switch contact LS8R' is now closed, energization of relay coil L occurs. Energization of coil L closes relay contacts L in the circuit of motor 82 thus causing rotation of the pump 80 in the opposite direction (i.e. to apply pressurized fluid in the direction of the full line arrow in FIG. 5) to cause outward actuation of the pistons and piston rods of the motor units 66, thereby causing downward pivotal movement of the clamping hooks 70 and locking of the extractor mechanism in positive parallel extending condition with respect to the travel zone and associated storage frame. The pressure continues to build up as the pump continues to operate until such time as pressure switch PRSW2 opens (e.g. 1400 p.s.i.) thereby stopping the actuation of the motor 82 and locking of the clamping mechanism in clamped condition. If there happens to be any leakage in the system, the pressure switch PRSW2 will reclose to reactivate the pump in the aforesaid direction, to cause reapplication of pressure (e.g. 1400 p.s.i.) to the clamping mechanism at which time the pressure switch PRSW2 will reopen to again cut off the pump motor.

It will be seen therefore that the clamping mechanism is automatically actuated upon initiation of acutation of the extractor to rotate it into predetermined condition with respect to the storage frame and with the motor pump 80 being shut off upon reaching a predetermined pressure between the clamping mechanism and the clamping lug as applied by the associated fluid powered motor unit.

To return the extractor mechanism to the left (its aforedescribed starting position) the control 118 is actuated to close contacts 124, and since switch contact LS8L is now closed, energization of "rotate to left" relay 2CR will occur to thus energize once more relay coil UL to start the unlocking cycle of the clamping mechanism as aforedescribed. Opening of pressure switch PRSW1 will of course energize relay coil RL (instead of coil RR) for rotary energization of the extractor motor 47 back toward the left.

From the foregoing discussion and accompanying drawings it will be seen that the invention provides a novel load handling apparatus which includes a load carrier movable alongside storage means in a travel zone and having an extractor mechanism rotatable about a generally vertical axis, together with clamping means provided for automatically locking the extractor mechanism in parallel extending relationship with respect to the direction of extension of the travel zone so as to expedite the handling of loads by the apparatus. The invention also provides a clamping arrangement which includes means for automatically deactivating the clamping means upon actuation of means for initiating rotation of the extractor mechanism in the opposite direction.

We claim:

1. In a load transfer and storage mechanism comprising storage means adapted to receive loads therein, a movable load carrier including a support and an extractor mounted on the support, said load carrier being adapted to move along a travel zone disposed adjacent the storage means for depositing loads into and retrieving loads from said storage means, means rotatably mounting said extractor on said support for rotary movement of said extractor about a generally vertical axis, electric power means for rotating said extractor to cause rotary movement of the latter with respect to said support and said storage means, power actuated locking means adapted for coaction between said support and said extractor for locking said extractor in predetermined position with respect to said support and said storage means, said locking means including fluid power operated motor unit means for actuation and deactuation of said locking means, control means for said motor unit means and said electrical power means, said control means including fluid pressure switch means and other switch means in circuit with said fluid pressure switch means, said switch means being operative to cause automatic actuation of said motor unit means to move said locking means to locking condition when said extractor is rotated to said predetermined position and operative to automatically actuate said motor unit means to move said locking means to unlocking condition upon initiation of actuation of said electric power means for rotating said extractor from said predetermined position, said electric power means being responsive to unlocking of said locking means by said motor unit means to cause rotary movement of said extractor away from said predetermined position.

2. A load transfer and storage mechanism in accordance with claim 1 including means for furnishing pressurized fluid to said motor unit means, and said control means including valve means coupled to said pressurized fluid furnishing means and to said pressure switch means for controlling the application of pressurized fluid from said pressurized fluid furnishing means to said motor unit means and vice versa.

3. A load transfer and storage mechanism in accordance with claim 1 wherein said support includes a hoist carriage movable vertically on generally vertically extending mast structure, said extractor being rotatably mounted on said hoist carriage for movement about said generally vertical axis, said locking means including a bracket, a hook member pivoted to said bracket for movement in a generally vertical plane, said fluid powered motor unit means comprising a reciprocal double-acting fluid-powered motor unit coacting between said bracket and said hook member for pivoting said hook member in said generally vertical plane, and lug means adapted for locking coaction with said hook member when said extractor is in said predetermined position and said hook member is pivoted by said motor unit toward said lug means, to lock said extractor in said predetermined position.

4. A load transfer and storage mechanism in accordance with claim 3 wherein said lug means is mounted on said extractor and includes a generally vertically oriented abutment thereon, said control means including plunger means movably mounted on said hoist carriage adapted for engagement with said abutment on said lug means for actuation of said plunger means when said extractor is moved to said predetermined position, and said other switch means being mounted on said load carrier and adapted for actuation by said plunger means when said extractor is in said predetermined position, for controlling in conjunction with said pressure switch means the actuation of said electric power means for rotating said extractor.

5. A load transfer and storage mechanism in accordance with claim 3 wherein said hook member comprises a generally vertically oriented tapered wedging face sloping downwardly in a direction away from the pivotal mounting of said hook member to said bracket, and said lug means includes a complementary generally vertically oriented tapered wedging face adapted for wedging coaction with said hook wedging face in the engaged condition of said hook member and said lug means, said lug means being mounted on said extractor and said bracket being mounted on said carriage.

6. A load transfer and storage mechanism in accordance with claim 3 wherein said storage means includes laterally spaced storage sections defining said travel zone therebetween, said locking means comprising a pair of hook members each of which is pivoted to an opposite side of said hoist carriage for movement in a generally vertical plane and in generally confronting relation to the respective one of said storage sections, said fluid-power motor unit means comprising a pair of reciprocal double-acting fluid-powered motor units, each one of which is coupled to a respective of said hook members, said motor units being coupled in parallel for simultaneous pivotal movement of said hook members, said locking lug means comprising a pair of transversely spaced lugs mounted on said extractor for rotary movement with said extractor, one of said lugs being adapted for locking coaction with a respective one of said hook members when said extractor is disposed in confronting relation with one of said storage sections, and the other of said lugs being adapted for locking coaction with the other of said hook members upon rotation of said extractor approximately 180 degrees.

7. A load transfer and storage mechanism in accordance with claim 3 wherein said control means includes electroresponsive means in circuit with said electric power means and said pressure switch means for controlling actuation of said electric power means for rotating said extractor.

8. A load transfer and storage mechanism in accordance with claim 2 wherein said pressurized fluid furnishing means includes an electrical motor unit drivingly coupled to a pump, said pressure switch means being in circuit with the last mentioned motor unit for causing actuation of said last mentioned motor unit for furnishing pressurized fluid to said motor unit means for moving the locking means to unlocking condition upon initiation of actuation of said electric power means for causing rotary movement of said extractor.

9. A load transfer and storage mechanism in accordance with claim 5 including means for selectively adjusting the position of said lug means.

References Cited

UNITED STATES PATENTS

| | | | |
|---|---|---|---|
| 763,976 | 7/1904 | Gurney | 187—73 |
| 1,210,288 | 12/1916 | Farr | 104—47 |
| 2,553,378 | 5/1951 | Miller | 212—21 |
| 2,699,247 | 1/1955 | White | 214—151 |
| 2,910,204 | 10/1959 | Wight | 214—730 |
| 3,029,959 | 4/1962 | Crosby et al. | 214—16.4 |
| 3,202,242 | 8/1965 | Dolphin | 214—730 X |
| 3,275,171 | 9/1966 | Shoic | 214—730 X |
| 3,268,097 | 8/1966 | Armington et al. | 214—730 X |

GERALD M. FORLENZA, *Primary Examiner.*

R. B. JOHNSON, *Assistant Examiner.*

U.S. Cl. X.R.

212—21; 214—730